Dec. 11, 1923.  B. MORGAN  1,477,071
HOSE CLAMP
Filed Aug. 8, 1922
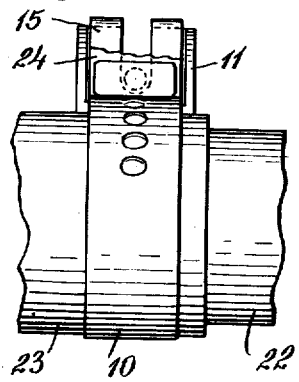
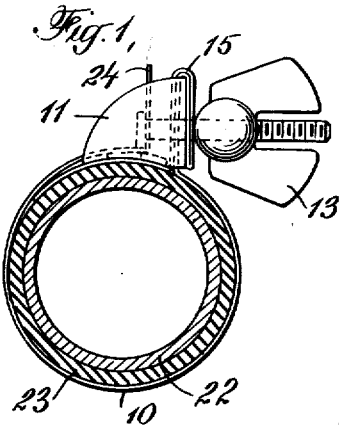
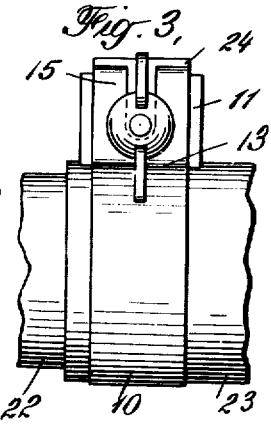
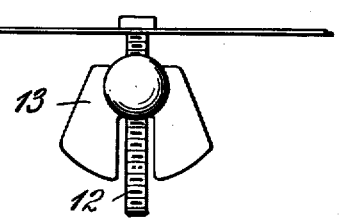
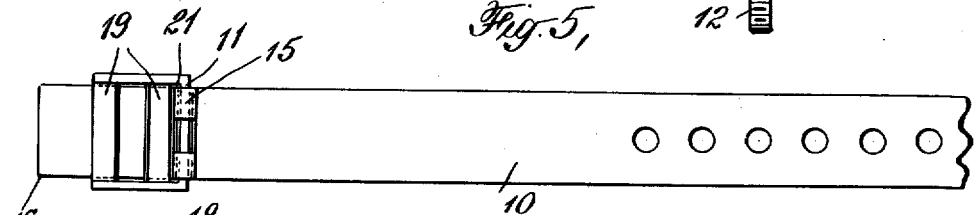
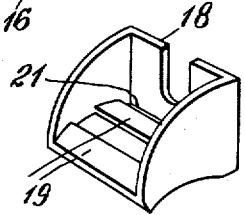
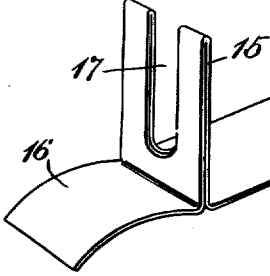
Bernard Morgan
INVENTOR
BY Pennie, Davis, Marvin & Edmonds
HIS ATTORNEYS Patented Dec. 11, 1923.

1,477,071

UNITED STATES PATENT OFFICE.

BERNARD MORGAN, OF KEENE, NEW HAMPSHIRE.

HOSE CLAMP.

Application filed August 8, 1922. Serial No. 580,390.

*To all whom it may concern:*

Be it known that I, BERNARD MORGAN, a subject of Great Britain, residing at Keene, in the county of Cheshire, State of New Hampshire, have invented certain new and useful Improvements in Hose Clamps; and I do hereby declare the following to be a full, clear, and exact description of the invention, such as will enable others skilled in the art to which it appertains to make and use the same.

This invention is directed to the construction of an improved form of clamp for effecting the connection between two tubular members, such for instance, as a tubular hose on a metallic part and the end of a length of rubber hose. A clamp constructed in accordance with the invention is of especial benefit in effecting the connection between the ends of a piece of rubber hose and the projecting tubular members of the water jacket of an internal combustion engine and the radiator of an automobile. The ends of the rubber hose may be forced over the tubular members and the clamps tightened up upon the hose to fasten it securely to the tubular members.

The clamp comprises a band of sheet metal bent to circular form, with a bolt and nut passing through a perforation in one end and having the other end turned up and slotted and having a rigid brace member attached to it. When this clamp is applied to a hose connection the bolt is dropped into the slot and the nut turned up to draw the ends of the sheet metal band together to tighten the clamp. While the clamp is being tightened the presence of the brace member prevents the bending of the turned up end of the metal band by converting the tangential reaction of the nut against the turned up end into radial pressure against the hose. The provision of this brace member allows of considerable pressure being exerted by the nut and bolt in drawing the ends of the metal band together without pinching the hose in the space between the ends of the metal band. Preferably, however, a guard-piece is placed under the brace to bridge the gap between the ends of the clamping band, as it can be made somewhat longer than the width of the brace to better keep the hose smooth.

In constructing the binding band of this improved hose clamp a strip of sheet metal has a loop formed in it in the vicinity of one of its ends, the sides of this loop being pressed together to form an upturned ear of double thickness of metal and preferably leaving an extension on the outer side of this ear in the plane of the clamping portion of the band, which extension forms the guardpiece to bridge the gap between the upturned ends of the metal clamping band when it is in place. The brace member is constructed in any suitable manner, and slipped over the aforementioned upturned ear of the clamping band which ear has been previously slotted to receive the clamping bolt. The outer ends of the ear are then turned down over the upper edge of the brace member which is thereby permanently and securely fastened to the clamping band, the feet of the brace member resting upon the guardpiece instead of coming directly in contact with the hose. The compressed loop ear bent around the face of the brace member affords an extremely rigid construction.

One of the primary advantages of this form of clamp is the ability to draw the ends of the metal band together with great pressure without pinching or otherwise damaging the hose, the pressure being applied more evenly throughout the circumference of the clamp than is ordinarily obtained with clamps in every day use. Another advantage of this construction is found in the fact that it is quickly attached or detached and is adjustable to various sizes of hose. A clamp made in accordance with this invention is rugged and will withstand considerable misuse, but at the same time can be manufactured at a reasonable cost.

The features of construction of the clamp outlined above may be better understood by referring to the following detailed description taken in conjunction with the accompanying drawings which illustrate the preferred embodiment of the invention. In these drawings, Fig. 1 is a view partly in cross section and partly in elevation of the clamp assembled in place;

Fig. 2 is a view in elevation of the clamp shown in Fig. 1 looking from the left.

Fig. 3 is a view in elevation of the clamp shown in Fig. 1 looking from the right.

Fig. 4 is a view of the clamp by itself with all its parts assembled.

Fig. 5 is a plan view of the same clamp as shown in Fig. 4.

Figs. 6 and 7 are perspective views of the brace member and the clamping band, respectively, illustrating their construction and the manner in which they are assembled.

Referring first to Figs. 4 to 7, inclusive, the clamp consists of four parts, the clamping band 10 of sheet metal, the brace member 11, the bolt 12 and the nut 13 which is preferably a thumb or wing nut in order that the clamp may be applied by hand. The brace member 11 is a box-like construction and is so made that it is perfectly rigid under the forces which are applied to it. The clamping band 10 is made of a strip of any suitable sheet metal such as steel or brass, and is provided at one end with a series of perforations 14, through any one of which, depending upon the size of the hose, the bolt 12 may be inserted. In the vicinity of the opposite end of the sheet metal band 10 a compressed loop forming an ear 15 of double thickness of metal is formed leaving the end 16 extending beyond the ear 15 in the plane of the band 10. This extension 16 forms a guard-piece to fill the gap between the open ends of the clamp when it is bent in place, and it may be slightly curved so as to conform to the surface of the hose. The ear 15 is slotted as shown at 17.

The brace member 11 is a rigid box-like structure of metal, such as steel or brass, and is formed with the sloted face 18 adapted to cooperate with the ear 15 of the metal band. It is also provided with feet 19 which are connected to the face 18 by means of the roughly triangular sides 20 and which are adapted to rest upon the guard-piece 16 to maintain the angular position of the ear 15 with respect to the guard-piece 16.

To assemble the members 10 and 11, the ear 15 is inserted through the slot 21 provided in member 11 for this purpose and the outer ends of the ear 15 are then bent over the upper edge of face 18 as best shown in Fig. 4 thereby permanently and securely fastening the brace member 11 to the metal band 10. The rigidity and ruggedness of this clamp construction is quite evident from the box-like structure of the brace member 11, the feet of which tie together the sides 20 and thus brace them against lateral displacement, and from the fact that through the face of the clamp where the pressure of the clamping nut 13 is applied there are five thicknesses of metal. Four of these thicknesses are supplied by the compressed loop ear of the binding or clamping band 10.

Referring now to Figs. 1, 2 and 3, 22 indicates a metal projection or pipe to which it is desired to fasten the hose 23. The completed clamp as shown in Fig. 4 is therefore applied to the surface of the hose by laying the guard-piece 16 upon the hose and bending the metal band 10 around the same to ascertain the proper hole 14 into which the bolt 12 should be placed. After this is found the outer end of the band 10 is bent at right angles around the elongated head of the bolt 12 to form a second upturned ear 24. The extra length of band 10 may then be cut off. The bolt being inserted through the ear 14 in the ear 24 may now be dropped into the slot 17 of ear 15 and the nut 13 tightened to draw together the ears 15 and 23 so as to clamp the hose securely to the metal projection 22. During this clamping process the brace member 11, whose feet bear upon the surface of the hose through the means of the guard-piece 16, maintains the desired angular position between the ear 15 and the guard-piece 16 and effectually prevents the bending of the ear 15 which would otherwise occur. The outside end of the clamping band 10 rides up on the top of the guard-piece 16 and the feet 19 of the brace member 11 whereby the clamping force exerted by the elongated head of the bolt 12 is applied in substantially a tangential direction, pulling the clamping band 10 firmly around the hose and evenly distributing the clamping pressure over the whole surface of the clamping band. The brace member 11 not only stiffens the ear 15 and provides a rigid structure against which the clamping nut may press, but also holds down the hose in the space between the ears 15 and 24 by means of its feet 19 and guard-piece 16. By the use of this clamp, therefore, the nut 13 may be tightened up without fear of straining the clamp so as to render its clamping action imperfect and without fear of damage to the hose upon which it is placed.

I claim:

1. A hose clamp comprising the combination of a sheet metal strip bent to circular form, a bolt passing through a perforation in one end of the strip and through a brace member secured to the opposite end of the strip by means of a compressed loop formed in the strip and inserted through the brace member and bent around a portion thereof, said brace member being so positioned as to convert a portion of the tangential clamping force of the bolt into radial pressure exerted against the surface of the hose through the guard piece.

2. A hose clamp comprising a flexible clamping band, a brace member and a clamping bolt, the brace member being attached to the clamping band by forming a loop near one end of said band, compressing the sides of this loop together to form it into an ear, inserting said ear through an aperture in said brace member adjacent the inner surface of one face thereof, and bending the end of said ear so that it will lie adjacent the outer surface of said face.

3. A hose clamp comprising a binding band adapted to encircle a hose, a tightening device passing through a perforation in one end of the band and through a brace member secured to the band near the opposite end thereof by means of a compressed loop formed in the band and inserted through the brace member and bent around a portion thereof, the end of said band extending beyond said loop serving as a guard piece, said brace member having feet adapted to bear upon said guard piece and being so positioned as to convert a portion of the tangential clamping force of the bolt into radial pressure exerted against the surface of the hose.

4. A hose clamp comprising a flexible clamping band having an elongated closed slot therein, a brace member and a clamping bolt, the brace member being attached to the clamping band by forming a loop in the portion of said band containing said slot, compressing the sides of this loop together to form it into an ear with an open slot, inserting said ear through an aperture in said brace member adjacent the inner surface of one face thereof, and bending the end of said ear so that it will be adjacent the outer surface of said face and present an open slot for the reception of the clamping bolt.

In testimony whereof I affix my signature.

BERNARD MORGAN.

Certificate of Correction.

It is hereby certified that in Letters Patent No. 1,477,071, granted December 11, 1923, upon the application of Bernard Morgan, of Keene, New Hampshire, for an improvement in "Hose Clamps," an error appears in the printed specification requiring correction as follows: Page 2, line 113, claim 1, after the word "thereof" insert the words *and a guard piece extending forwardly of said loop;* and that the said Letters Patent should be read with this correction therein that the same may conform to the record of the case in the Patent Office.

Signed and sealed this 22d day of January, A. D., 1924.

[SEAL.]

KARL FENNING,
*Acting Commissioner of Patents.*